US012208915B2

(12) United States Patent
Bellahbib et al.

(10) Patent No.: US 12,208,915 B2
(45) Date of Patent: Jan. 28, 2025

(54) AIRCRAFT ASSEMBLY FITTED WITH AT LEAST ONE HYDROGEN-POWERED THRUST REVERSER ACTUATION SYSTEM

(71) Applicant: SAFRAN NACELLES, Gonfreville-L'Orcher (FR)

(72) Inventors: Jihane Bellahbib, Moissy-Cramayel (FR); Hakim Maalioune, Moissy-Cramayel (FR)

(73) Assignee: SAFRAN NACELLES, Gonfreville-l'Orcher (FR)

( * ) Notice: Subject to any disclaimer, the term of this patent is extended or adjusted under 35 U.S.C. 154(b) by 115 days.

(21) Appl. No.: 18/058,483

(22) Filed: Nov. 23, 2022

(65) Prior Publication Data

US 2023/0174248 A1 Jun. 8, 2023

(30) Foreign Application Priority Data

Nov. 25, 2021 (FR) ........................................ 2112526

(51) Int. Cl.
*B64D 37/30* (2006.01)
*B64D 41/00* (2006.01)
*F02K 1/54* (2006.01)
*F02K 1/76* (2006.01)

(52) U.S. Cl.
CPC ................ *B64D 37/30* (2013.01); *F02K 1/54* (2013.01); *F02K 1/76* (2013.01); *B64D 2041/005* (2013.01)

(58) Field of Classification Search
CPC ......... B64D 37/30; B64D 33/04; B64D 37/04
USPC ................................................. 318/362, 140
See application file for complete search history.

(56) References Cited

U.S. PATENT DOCUMENTS

| 5,003,772 | A | * | 4/1991 | Huber | ....................... | F02K 9/48 |
| | | | | | | 60/260 |
| 7,268,521 | B1 | * | 9/2007 | Prakash | .................. | F02D 41/28 |
| | | | | | | 320/166 |
| 7,555,893 | B2 | * | 7/2009 | Okai | ........................ | F02K 3/06 |
| | | | | | | 60/228 |
| 8,890,350 | B2 | * | 11/2014 | Brust | ....................... | F02C 7/32 |
| | | | | | | 290/52 |

(Continued)

FOREIGN PATENT DOCUMENTS

| CN | 113232869 A | 8/2021 |
| GB | 2 402 660 A | 12/2004 |

OTHER PUBLICATIONS

France Search Report and Written Opinion mailed Jul. 4, 2022, issued in Application No. FR2112526, filed Nov. 25, 2021, 6 pages.

*Primary Examiner* — David Luo
(74) *Attorney, Agent, or Firm* — Christensen O'Connor Johnson Kindness PLLC

(57) ABSTRACT

Aircraft having at least one propulsion unit supplied with hydrogen by at least one hydrogen tank, and having at least one thrust reversal system including at least one actuator. The aircraft can include at least one means for storing or transporting the residual hydrogen of the propulsion unit, a fuel cell disposed in the hydrogen power source and supplied with hydrogen by the at least one means for storing the residual hydrogen, and a hydrogen thrust reverser actuation system. The thrust reverser actuation system can include a hydrogen thrust reverser actuation controller and a hydrogen primary power unit with a fuel cell supplied with hydrogen and powering the at least one thrust reverser actuator.

9 Claims, 2 Drawing Sheets

(56) References Cited

U.S. PATENT DOCUMENTS 9,630,512 B2 * 4/2017 Yoon .................. B60L 58/10
10,913,543 B2 2/2021 Bailey et al.

* cited by examiner ical field of the invention is thrust reversers for
AIRCRAFT ASSEMBLY FITTED WITH AT LEAST ONE HYDROGEN-POWERED THRUST REVERSER ACTUATION SYSTEM

TECHNICAL FIELD

The technical field of the invention is thrust reversers for an aircraft engine unit, and more particularly such reversers for aircraft engine units operating on hydrogen.

PRIOR ART

To face the environmental and ecological challenges with which aviation is confronted, several worldwide players in the sector are following in the tradition of zero-emissions green aviation promising hydrogen turbojets to equip the airplanes of tomorrow.

In this context, it is necessary to have available a new architecture of a TRAS thrust reverser actuation system adapting to the presence of hydrogen as a new source of energy.

It is recalled that hydrogen has very particular characteristics that must be taken into account to better understand its use in a TRAS thrust reverser actuation system.

The storage and the distribution of hydrogen require a storage space approximately four times greater than that of kerosene. The hydrogen must be liquefied at −250° C. in order to lower its density at low pressure and allow its aerodynamic integration in an aircraft.

In this form, the hydrogen cannot be stored in the wings of an aircraft, contrary to that which is routinely carried out for the storage of kerosene, for aerodynamic reasons. In other words, such a storage would make the wings rigid and would be responsible for problems of aeroelastic deformation.

Hydrogen is generally used via a fuel cell combining the oxygen from the air with the hydrogen in order to form a current of protons and of electrons subsequently forming an electric current and, as residue, water. This current allows to power electric machines, and is in particular used as a main source of energy to drive the actuators of a thrust reverser.

The structure of a thrust reverser actuation system as illustrated by the document FR2990248 is also recalled.

A thrust reverser device is disposed with a propulsion unit, in particular a turbojet, in a propulsion nacelle.

The thrust reverser device comprises at least one element movable between a closing position (stow phase) and an opening position (deploy phase) cooperating in the opening position for the production of the thrust reversal.

In the deployed position, the thrust reverser device opens in the nacelle a passage intended for the deflected flow of air and, in a retraction position, it closes this passage.

The reorientation of the flow of air is carried out by cascade vanes, associated with second movable elements, namely reversal flaps upstream of the hood, the hood only having a simple sliding function aiming to expose or cover these cascade vanes, in addition to maintaining the nacelle in the closed and locked position in flight phase.

As for the reversal flaps, they form blocking doors that can be activated by the sliding of the hood engendering a closing of the cold flow jet downstream of the vanes, so as to optimize the reorientation of the flow of cold air.

It should be noted that other thrust reverser devices are known, in particular a thrust reverser device with doors or with reversal flaps downstream of the hood of the nacelle to which this invention would also totally apply.

The document FR2990248 also describes a device for controlling a thrust reverser actuation system powered by an electric generator.

The conventional architecture of an ETRAS electrical thrust reverser actuation system illustrated by FIG. 1 is recalled.

An assembly for an aircraft 1a is provided with a power source 2 powering an ETRAS electrical thrust reverser actuation system labelled 3 and with an electronic controller, labelled 4. It is noted that the electronic controller can be located on the engine side or on the airplane side.

The ETRAS electrical thrust reverser actuation system 3 comprises an ETRAC electrical thrust reverser actuation controller, labelled 5.

The ETRAC controller 5 exchanges data and commands with the electronic controller 4.

Moreover, the ETRAC controller 5 is connected to a set 6 of means, comprising braking, locking and surveillance means, via a first set of connections, and to a primary power unit, labelled 7, by another set of connections.

The two connections are provided with disconnection means 8.

The primary power unit 7 powers electric actuators via a rotating electric machine.

The rotating electric machine is a reversible alternator that operates either in alternator mode that is to say as an electric generator or motor mode that is to say as an electric motor to drive the corresponding electromechanical maneuvering members via transmission shafts.

The electric actuators allow to maneuver the movable elements between their positions of closing and of opening the thrust reverser device.

There thus remains a technical problem relative to the optimization of an electric TRAS thrust reverser actuation system in an aircraft powered mainly by a power source operating on hydrogen.

The document FR3009544 is known from the prior art.

The document FR3009544 describes a propulsion nacelle comprising a system for storing energy and for converting the energy generated by the actuators when they brake, an electrolyzer powered by the system for storing energy and a fuel cell supplied with hydrogen and oxygen produced by the electrolyzer. The engine unit nacelle thus formed is independent in terms of energy. The specificity of this nacelle lies in the fact that it does not comprise a means for storing the oxygen and the hydrogen used to supply the fuel cell or to store these same gases generated by the electrolyzer.

Thus, in the case of interruption of the electric power supply of the propulsion nacelle, the electric power supply of the thrust reverser actuator is also interrupted because of the interruption of the electrolysis.

There is therefore a need for a TRAS thrust reverser actuation system powered by a power source operating on hydrogen, which is electrically independent of the power supply of the aircraft.

DISCLOSURE OF THE INVENTION

One object of the invention is an assembly for an aircraft provided with at least one propulsion unit supplied with hydrogen by at least one hydrogen tank, provided with at least one thrust reversal system comprising at least one actuator. The assembly for an aircraft comprises:

a fuel cell disposed in a hydrogen power source and supplied with hydrogen a hydrogen thrust reverser actuation system comprising a hydrogen thrust reverser actuation controller, and a hydrogen primary power unit provided with a fuel cell supplied with hydrogen and powering the at least one thrust reverser actuator.

The fuel cell disposed in the hydrogen power source can be supplied with hydrogen by the hydrogen tank.

The assembly for an aircraft may comprise at least one means for storing the residual hydrogen of the propulsion unit supplying hydrogen to the fuel cell disposed in the hydrogen power source.

The assembly for an aircraft may comprise an integrated power plant system powered by the hydrogen power source for the low powers and by the hydrogen primary power unit for the high powers.

The supply of hydrogen to the hydrogen primary power unit can transit through the hydrogen power source so as to take advantage of the at least one means for storing the residual hydrogen of the propulsion unit.

The assembly for an aircraft may comprise a supercapacitor charged during the flight by the hydrogen primary power unit, allowing to power the thrust reverser actuators, alone or in combination with the fuel cell.

The hot water produced by the at least one of the fuel cells of the hydrogen power source or of the hydrogen primary power unit can be used for functions ancillary to the thrust reverser actuation.

A propulsion unit and the corresponding at least one thrust reversal system can be disposed in a nacelle.

The object of the invention is also an aircraft comprising the assembly for an aircraft described above.

BRIEF DESCRIPTION OF THE DRAWINGS

Other goals, features and advantages of the invention will appear upon reading the following description, given only as a non-limiting example and made in reference to the appended drawings in which.

DETAILED DESCRIPTION

The thrust reverser actuation system according to the invention allows to use the excess hydrogen used for the propulsion of the aircraft to ensure the local functions allowing this thrust reversal after conversion into electric energy. This is carried out via a fuel cell, which has the following advantages.

The fuel cell is compact and light and can be installed near equipment that consumes electric power. An improvement in the quality of the electric power supply with respect to networks in which producers and consumers are distant is thus obtained.

In addition to the generation of electric power, the fuel cell allows to generate hot water that can be used in other onboard uses, in particular de-icing, thus conferring onto it a multifunctional nature.

The fuel cell also has the advantage of being noiseless, vibrationless and of not emitting pollution.

Finally, the fuel cell has a wide range of powers, which can be dimensioned to produce from several watts to several megawatts.

Figure 1:
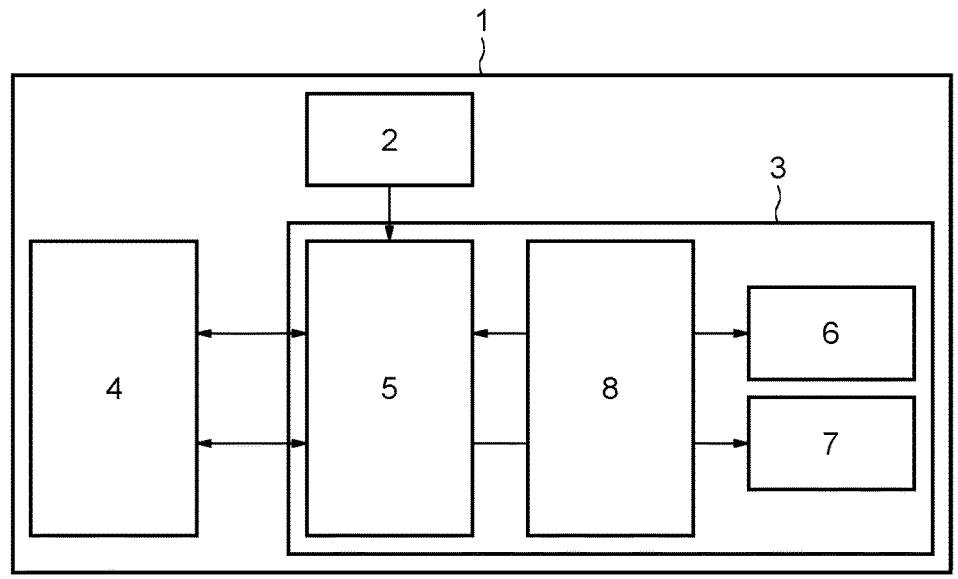
FIG. 1 illustrates the main elements of an electrical thrust reverser actuation system.
Figure 2:
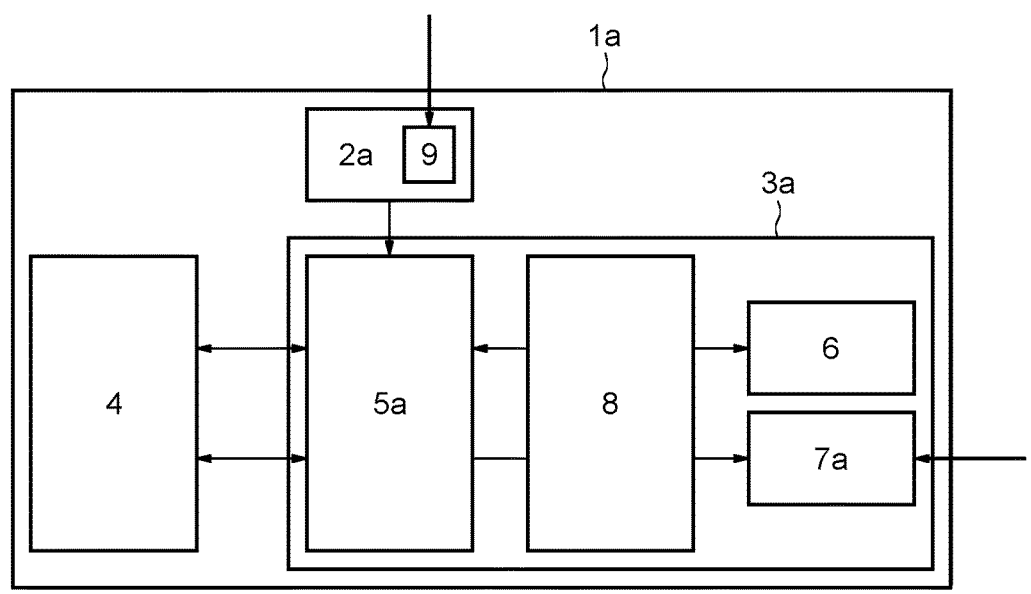
FIG. 2 illustrates the main elements of a thrust reverser actuation system in a first implementation of the invention.

A first implementation of an H2TRAS (acronym for H2 thrust reverser actuation system) hydrogen thrust reverser actuation system according to the invention is labelled 3a in FIG. 2.

An assembly for an aircraft 1a with hydrogen propulsion is provided with a hydrogen power source 2a powering an H2TRAS hydrogen thrust reverser actuation system labelled 3a. Moreover, the assembly for an aircraft 1a is provided with an electronic controller labelled 4. The hydrogen power source 2a is supplied by the residual hydrogen of the propulsion functions of the aircraft during the flight phases. The residual hydrogen is in liquid or gaseous form. Moreover, the hydrogen power source 2a comprises means for local storage of hydrogen 9 such as a cryogenic tank, allowing to store this excess for a later use. Such a storage also allows to have available a stock of hydrogen in case of failure of the main supply in order to ensure a minimum independence for the thrust reverser actuation system. The hydrogen can be stored there in liquid or gaseous form.

The H2TRAS hydrogen thrust reverser actuation system 3a comprises at least one movable element, at least one actuator and an H2TRAC hydrogen thrust reverser actuation controller, labelled 5a. The movable element is mechanically connected to at least one actuator so as to be able to go from a closing position to an opening position and vice versa. The at least one actuator is controlled by the H2TRAC controller 5a. In the closing position, the movable element is retracted, so as to ensure an aerodynamic continuity with the other elements of the nacelle housing the propulsion unit, in such a way that it is able to generate its thrust. In the opening position, the movable element allows to redirect the flow of air generated by the propulsion unit in order to slow down the aircraft. The H2TRAC controller 5a exchanges data and commands with the electronic controller 4. Moreover, the H2TRAC controller 5a is connected to a set 6 of means, comprising braking, locking and surveillance means, via a first set of connections, and to an H2PMDU (hydrogen power main drive unit) hydrogen primary power unit labelled 7a by another set of connections. The H2PMDU hydrogen primary power unit 7a comprises a fuel cell generating the electric power necessary for the actuation of the thrust reversal from a supply of hydrogen by the aircraft.

The two connections are provided with disconnection means 8.

The H2TRAS hydrogen thrust reverser actuation system 3a allows to use the electric energy generated locally by the hydrogen power source 2a in order to power the hydrogen thrust reverser actuation controller 5a.

The means for local storage of hydrogen 9 allow to ensure an independence of the supply of the hydrogen power source 2a in order to guarantee the supply of electric power to the control functions of the thrust reverser actuator.

Moreover, the H2PMDU hydrogen primary power unit 7a powering the thrust reverser actuators forms an independent and high-quality electric power supply network.

Figure 3:
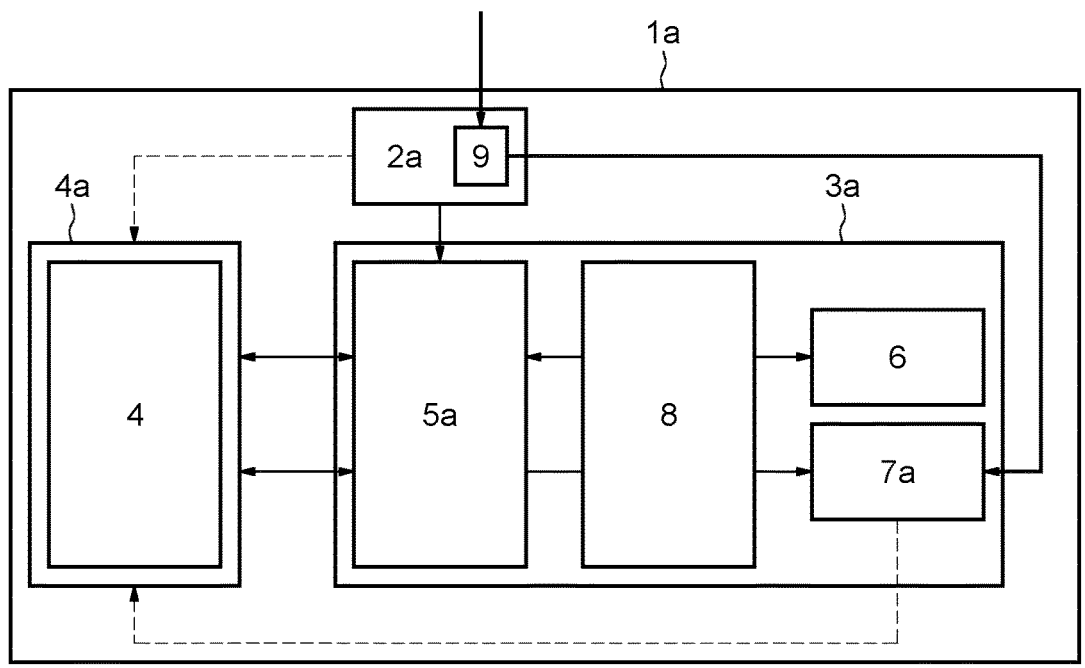
FIG. 3 illustrates the main elements of a thrust reverser actuation system in a second implementation of the invention.

A second implementation is illustrated by FIG. 3. It differs from the first implementation by the generalization of the use of the electric energy generated by the hydrogen power source 2a to other equipment coming from the IPPS integrated power plant system labelled 4a, in addition to the power supply of the hydrogen thrust reverser actuation controller 5a. The IPPS integrated power plant system 4a comprises in particular the electronic controller 4, the engine pump, the engine actuators, sensors, valves and the NAI (acronym for nacelle anti-icing) de-icing system.

The H2PMDU hydrogen primary power unit 7a is supplied with hydrogen via the hydrogen power source 2a so as to take advantage of the local storage of hydrogen in the means for local storage of hydrogen 9. Moreover, the H2PMDU hydrogen primary power unit 7a is connected to the IPPS integrated power plant system 4a to provide it with an electric power supply when significant powers are required.

In addition to protecting the functions of controlling the thrust reversal, the architecture of the second implementation has the advantage of protecting the functions of thrust reverser actuation from an interruption of the supply of hydrogen by the aircraft. Like in the first implementation, by producing the energy required for these functions as close as possible to their location of consumption, losses and network quality problems (total harmonic distortion, failures, transient overvoltages, etc.) are avoided.

It is thus understood that the fuel cells are responsible for the electric core necessary for the thrust reverser actuation. Moreover, these fuel cells, in particular the one at the hydrogen primary power unit 7a, can be supported by supercapacitors for a storage of energy during the flight. It is thus possible to dimension the power of the fuel cells as tightly as possible in order to limit the cost and the bulk. In the case of a peak of power consumption, the supercapacitors can contribute to the instantaneous power used by the thrust reverser actuation.

Figure 4:
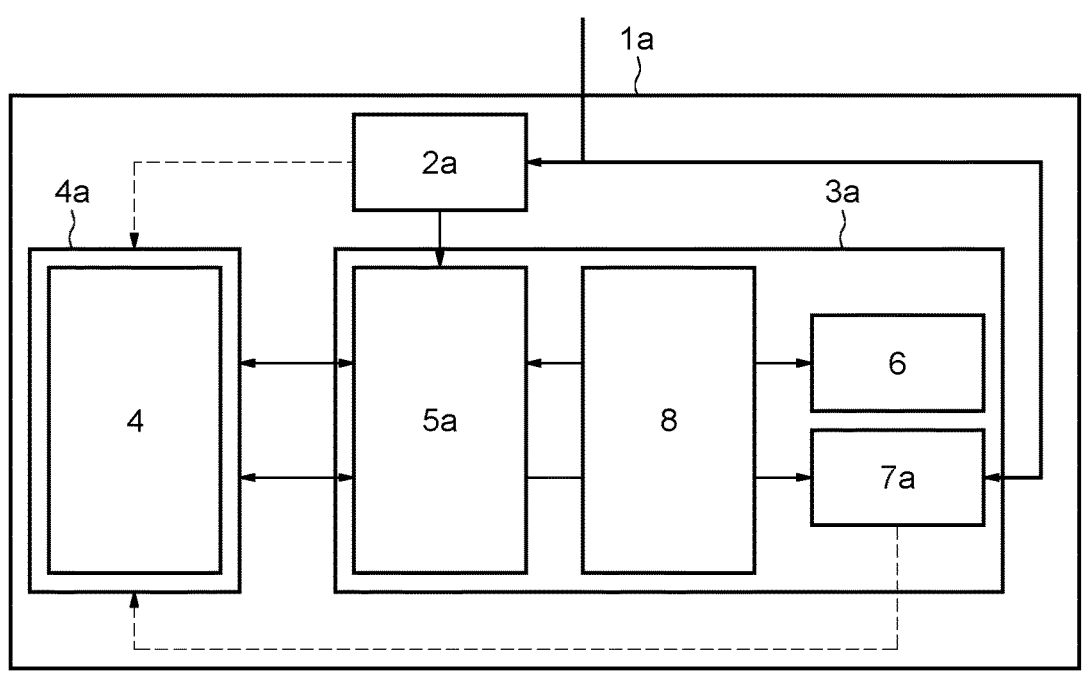
FIG. 4 illustrates the main elements of a thrust reverser actuation system in a third implementation of the invention.

A third implementation is illustrated by FIG. 4. It differs from the second implementation by the absence of means for local storage of hydrogen 9. The hydrogen supplying the H2PMDU hydrogen primary power unit 7a and the hydrogen power source 2a is thus directly transported from the hydrogen tank supplying the propulsion unit. Moreover, only the quantity necessary for the generation of the electric power and for the operation of the thrust reverser is taken.

The invention claimed is:

1. An assembly for an aircraft having at least one propulsion unit supplied with hydrogen by at least one hydrogen tank, and having at least one thrust reversal system including at least one actuator, the assembly comprising:
    a fuel cell disposed in a hydrogen power source; and
    a hydrogen thrust reverser actuation system, comprising:
        at least one movable element;
        at least one actuator;
        a hydrogen thrust reverser actuation controller; and
        a hydrogen primary power unit having a fuel cell supplied with hydrogen and powering the at least one thrust reverser actuator,
    wherein the movable element is mechanically connected to at least one actuator so as to be able to assume one of a closing position and an opening position, and
    wherein, in the opening position, the movable element allows redirection of the flow of air generated by the propulsion unit to slow down the aircraft.

2. The assembly of claim 1, wherein the fuel cell disposed in the hydrogen power source is supplied with hydrogen by the hydrogen tank.

3. The assembly of claim 2, further comprising an integrated power plant system powered by the hydrogen power source for low power and by the hydrogen primary power unit for high power.

4. The assembly of claim 1, further comprising at least one means for storing the residual hydrogen of the propulsion unit supplying hydrogen to the fuel cell disposed in the hydrogen power source.

5. The assembly of claim 4, wherein the supply of hydrogen to the hydrogen primary power unit transits through the hydrogen power source so as to take advantage of the at least one means for storing the residual hydrogen of the propulsion unit.

6. The assembly of claim 1, further comprising a supercapacitor charged during the flight by the hydrogen primary power unit, wherein the supercapacitor is configured to power the thrust reverser actuators, alone or in combination with the fuel cell.

7. The assembly of claim 1, wherein the hot water produced by the at least one of the fuel cells of the hydrogen power source or of the hydrogen primary power unit is used for functions ancillary to the thrust reverser actuation.

8. The assembly of claim 1, wherein a propulsion unit and the corresponding at least one thrust reversal system are disposed in a nacelle.

9. An aircraft comprising the assembly of claim 1.

* * * * *